United States Patent
Terada et al.

(10) Patent No.: US 9,998,622 B2
(45) Date of Patent: Jun. 12, 2018

(54) IMAGE PROCESSING APPARATUS AND CONTROL METHOD FOR PROCESSING PLURALITY OF PARTIAL IMAGES AND DETERMINING LAYOUT

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Takafumi Terada, Nagaizumi Sunto Shizuoka (JP); Naomi Nakane, Yokohama Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/241,238

(22) Filed: Aug. 19, 2016

(65) Prior Publication Data
US 2018/0054539 A1    Feb. 22, 2018

(51) Int. Cl.
G06K 15/00    (2006.01)
H04N 1/00    (2006.01)
G06F 3/12    (2006.01)

(52) U.S. Cl.
CPC ..... *H04N 1/00912* (2013.01); *H04N 1/00456* (2013.01); *H04N 1/00795* (2013.01); *H04N 2201/0094* (2013.01)

(58) Field of Classification Search
CPC ............. H04N 1/0044; H04N 1/00694; H04N 1/00912; H04N 1/00456; H04N 1/00623; H04N 1/00795; H04N 1/32379; H04N 2201/0093; H04N 2201/0094; H04N 2201/3287
USPC .................................................. 358/1.1–1.18
See application file for complete search history.

(56) References Cited

U.S. PATENT DOCUMENTS

| | | | |
|---|---|---|---|
| 6,453,078 B2 * | 9/2002 | Bubie | G06F 17/217 382/296 |
| 2009/0066746 A1 * | 3/2009 | Sakai | B41J 2/16585 347/20 |
| 2010/0199227 A1 * | 8/2010 | Xiao | G06F 3/0481 715/863 |
| 2014/0153059 A1 * | 6/2014 | Hirao | H04N 1/0044 358/449 |

FOREIGN PATENT DOCUMENTS

JP    2008-078757    4/2008

* cited by examiner

*Primary Examiner* — Gabriel Garcia
(74) *Attorney, Agent, or Firm* — Amin, Turocy & Watson, LLP

(57) ABSTRACT

An image processing apparatus includes an image data acquiring section configured to acquire image data of an image; a partial image acquiring section configured to acquire a plurality of partial images from each of a plurality of areas contained within the image on a basis of the image data acquired by the image data acquiring section; and a layout determination section configured to determine a layout by arranging a plurality of the partial images acquired by the partial image acquiring section.

16 Claims, 11 Drawing Sheets

FIG.3

| NUMBER | DIRECTION OF DOCUMENT | DIRECTION OF ARRANGEMENT | LEVEL |
|---|---|---|---|
| (1) | VERTICAL | VERTICAL | FIRST AREA,SECOND AREA |
| (2) | VERTICAL | VERTICAL | SECOND AREA,FIRST AREA |
| (3) | VERTICAL | HORIZONTAL | FIRST AREA,SECOND AREA |
| (4) | VERTICAL | HORIZONTAL | SECOND AREA,FIRST AREA |
| (5) | HORIZONTAL | VERTICAL | FIRST AREA,SECOND AREA |
| (6) | HORIZONTAL | VERTICAL | SECOND AREA,FIRST AREA |
| (7) | HORIZONTAL | HORIZONTAL | FIRST AREA,SECOND AREA |
| (8) | HORIZONTAL | HORIZONTAL | SECOND AREA,FIRST AREA |

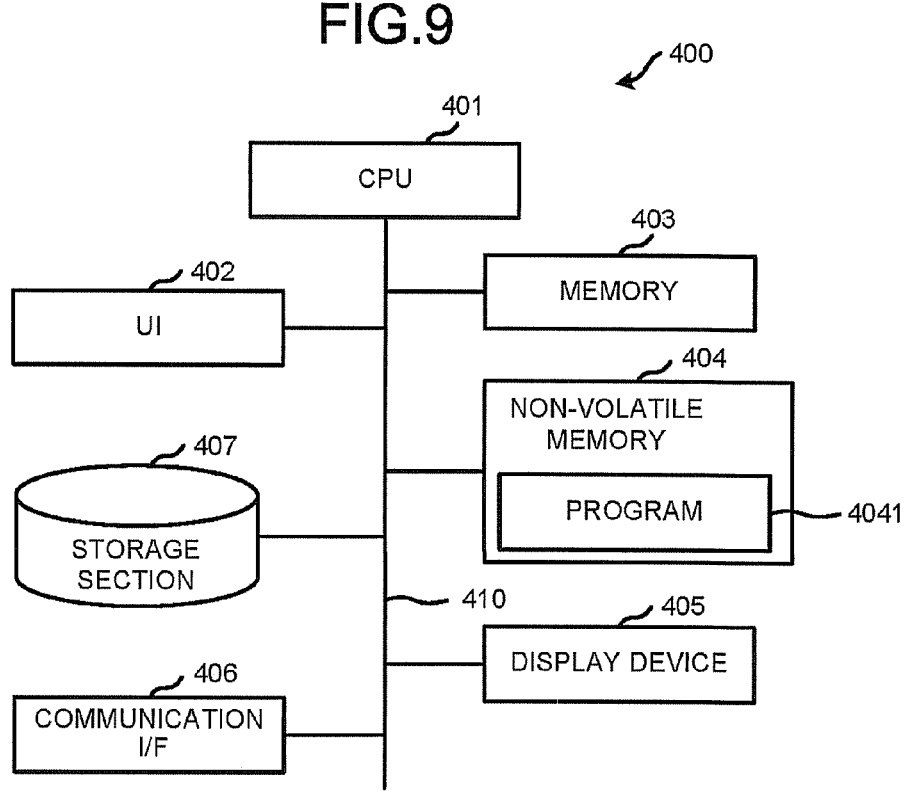
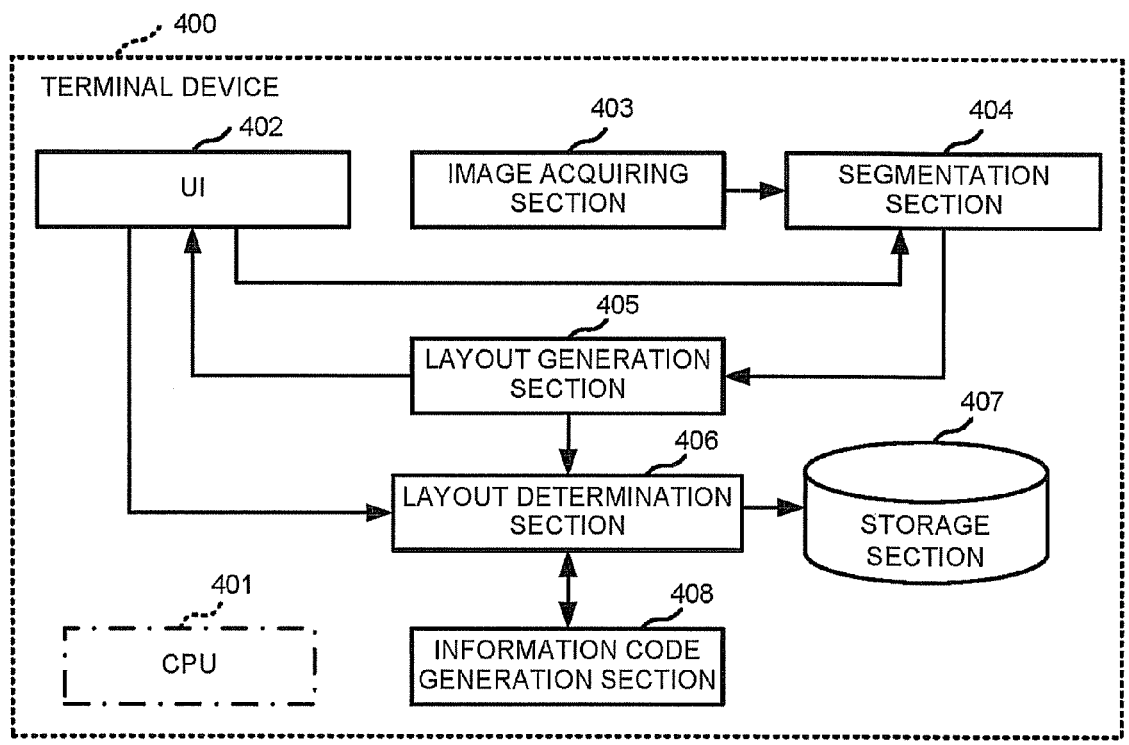

IMAGE PROCESSING APPARATUS AND CONTROL METHOD FOR PROCESSING PLURALITY OF PARTIAL IMAGES AND DETERMINING LAYOUT

FIELD

Embodiments described herein relate generally to an image processing apparatus and a control method.

BACKGROUND

Conventionally, a system is widely known which scans a document on which an image is printed and stores the scanned document as electronic data. Furthermore, a system is proposed which stores only part of area as electronic data but not the entire page of a document. For example, such a system preview-displays an image obtained by scanning the whole page on a control panel to enable a user to designate a portion to be segmented on the control panel.

However, in such a system, if there is a plurality of areas the user wants to leave on the document, images cannot be stored in a layout (order of arrangement) the user intends.

DESCRIPTION OF THE DRAWINGS

FIG. 3 is a diagram illustrating an example of a layout table;

FIG. 9 is a diagram illustrating an example of the configuration of a terminal device 400 according to the embodiment;

FIG. 10 is a functional block diagram illustrating functional components of the terminal device 400 according to the embodiment;

DETAILED DESCRIPTION

In accordance with an embodiment, an image processing apparatus comprises an image data acquiring section, a partial image acquiring section and a layout determination section. The image data acquiring section acquires image data of an image. The partial image acquiring section acquires a plurality of partial images from a plurality of areas contained in the image on the basis of the image data acquired by the image data acquiring section. The layout determination section determines a layout by arranging a plurality of the partial images acquired by the partial image acquiring section.

In accordance with an embodiment, a control or image processing method involves acquiring image data of an image; acquiring a plurality of partial images from each of a plurality of areas contained in the image on the basis of the image data; and determining a layout by arranging a plurality of the partial images.

Hereinafter, the image processing apparatus and a control method of the embodiment are described with reference to the accompanying drawings.

Figure 1:
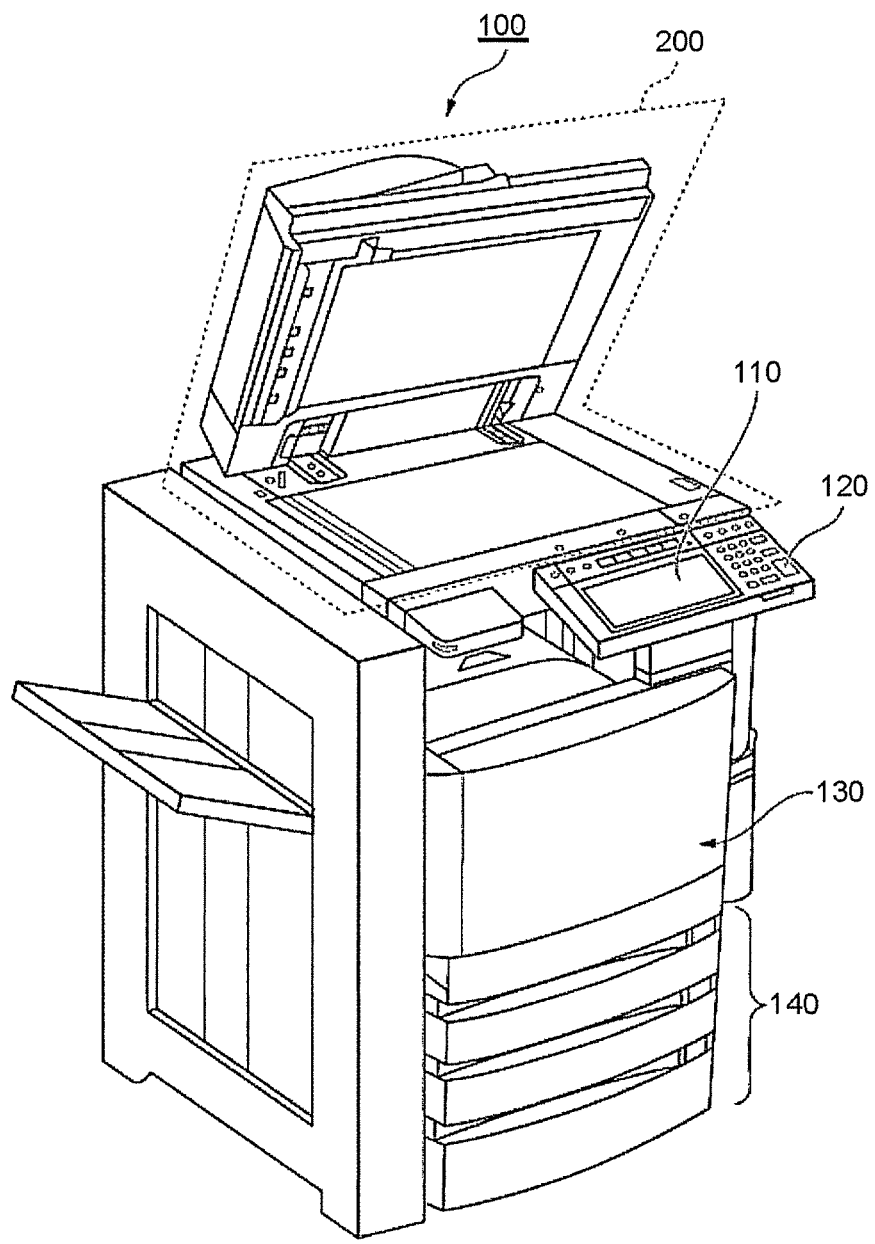
FIG. 1 is an external view illustrating an example of the whole configuration of an image processing apparatus 100 according to an embodiment.

FIG. 1 is an external view illustrating an example of the whole configuration of the image processing apparatus 100 of the embodiment. The image processing apparatus 100 is, for example, a multifunction peripheral. The image processing apparatus 100 is equipped with a display 110, a control panel 120, a printer section 130, a sheet housing section 140 and an image reading section 200. The printer section 130 of the image processing apparatus 100 may be a device for fixing a toner image or an inkjet type device.

The image processing apparatus 100 reads an image displayed on a sheet to generate digital data to generate an image file. The sheet may be, for example, a paper on which characters and images are recorded, a document and the like. The sheet may be an optional object as long as it can be read by the image processing apparatus 100.

The display 110 is an image display device such as a liquid crystal display, an organic EL (Electro Luminescence) display and the like. The display 110 displays various kinds of information relating to the image processing apparatus 100.

The control panel 120 includes a plurality of buttons. The control panel 120 receives an operation of a user. The control panel 120 outputs a signal corresponding to the operation carried out by the user to a controller of the image processing apparatus 100. The display 110 and the control panel 120 may be integrally constituted as a touch panel.

The printer section 130 forms an image on a sheet on the basis of image information generated by the image reading section 200 or image information received via a communication line. The printer section 130 forms the image through, for example, the following processing. The image forming section of the printer section 130 forms an electrostatic latent image on a photoconductive drum on the basis of the image information. The image forming section of the printer section 130 enables a developing agent to adhere to the electrostatic latent image to form a visible image. As a concrete example of the developing agent, toner is exemplified. A transfer section of the printer section 130 transfers the visible image onto the sheet. The fixing section of the printer section 130 heats and pressures the sheet to enable the visible image to be fixed on the sheet. Further, the sheet on which the image is formed may be a sheet stored in the sheet housing section 140 or a manually fed sheet.

The sheet housing section 140 houses the sheet used for image formation by the printer section 130.

The image reading section 200 reads the image information of a read object as intensity of light. The image reading section 200 records the read image information. The recorded image information may be sent to another information processing apparatus via a network. The recorded image information may be used for the image formation on the sheet through the printer section 130.

Figure 2:
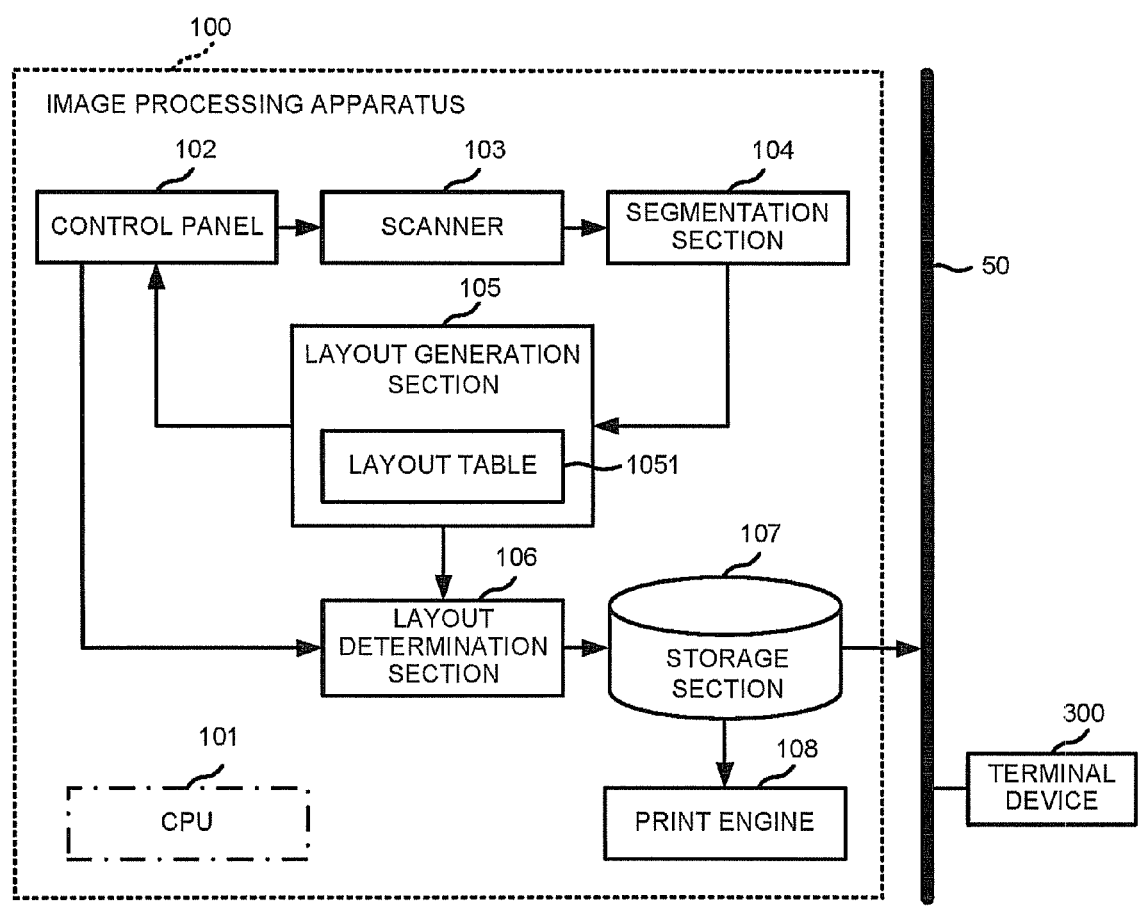
FIG. 2 is a functional block diagram illustrating functional components of the image processing apparatus 100 according to the embodiment.

FIG. 2 is a functional block diagram illustrating functional components of the image processing apparatus 100 of the embodiment.

The image processing apparatus 100, equipped with a CPU (Central Processing Unit) 101, a memory and an auxiliary storage device that are connected with each other via a bus line, executes a control program. The image processing apparatus 100 functions as an apparatus equipped with a control panel 102, a reading apparatus such as a scanner 103, a segmentation section 104, a layout generation section 105, a layout determination section 106, a storage section 107, and a print engine 108 through execution of the control program.

All or part of functions of the image processing apparatus 100 may be realized by using hardware such as an ASIC (Application Specific Integrated Circuit), a PLD (Programmable Logic Device), an FPGA (Field Programmable Gate Array) and the like. The control program may be recorded in a computer-readable recording medium. The computer-readable recording medium is a portable medium such as a flexible disk, a magneto-optical disk, a ROM and a CD-ROM, or a storage device such as a hard disk built in a computer system. The control program may be sent via an electric communication line.

The CPU 101 is an arithmetic apparatus that reads out programs and data stored in the storage section 107 on a RAM and carries out a processing to realize each function of the image processing apparatus 100.

The control panel 102 includes an input device for receiving input from the user and a display device for displaying a processing result of the image processing apparatus 100. For example, the control panel 102 is a display and input device such as a touch panel display.

The scanner 103 photographs a document on which an image is printed to generate image data. The scanner 103 outputs the image data to the segmentation section 104. Hereinafter, the document on which an image is printed is referred to as a "print document". Relative to the print document, a document on which no image is printed is referred to as a "document". In the print document, a plurality of areas is indicated by different colors. Thus, the image data output from the scanner 103 includes a plurality of the areas indicated by different colors. In the embodiment, the description of a case in which two areas are marked by a first color and a second color in the print document is continued. Hereinafter, the area indicated by the first color is labeled a "first area", and the area indicated by the second color is labeled a "second area". Furthermore, the first color is indicated by a solid line, and the second color is indicated by a broken line.

The segmentation section 104 extracts an image of the first area and an image of the second area on the basis of the image data supplied from the scanner 103. For example, the segmentation section 104 may extract the image of the first area and the image of the second area from an image obtained by processing the image data supplied from the scanner 103. Further, the segmentation section 104 extracts image data of the image of the first area and image data of the image of the second area from the image data supplied from the scanner 103. Then, the segmentation section 104 may extract the image of the first area and the image of the second area by processing the image data of the image of the first area and the image data of the image of the second area. The segmentation section 104 acquires the image data of the image of the first area and first color information as a set and acquires the image data of the image of the second area and second color information as a set. For example, the segmentation section 104 extracts the image of the first area and the image of the second area in each page. The segmentation section 104 supplies a set of the image data of the image of the first area and the first color information and a set of the image data of the image of the second area and the second color information to the layout generation section 105.

The layout generation section 105 acquires a first image by processing the image data of the image of the first area supplied from the segmentation section 104. Furthermore, the layout generation section 105 acquires a second image by processing the image data of the image of the second area supplied from the segmentation section 104.

The layout generation section 105 generates a plurality of images representing candidates of a layout in a case of arranging the first image and the second image on the document. For example, the layout generation section 105 generates a plurality of images representing candidates of a layout in which a thumbnail of the first image and a thumbnail of the second image are arranged on the document. The layout generation section 105 outputs a plurality of the images representing the candidates of the layout to the control panel 102. Further, the layout generation section 105 outputs information representing the candidate of the layout to the layout determination section 106. For example, the layout generation section 105 stores a layout table 1051. A plurality of the candidates of the layout of arrangement of the first image and the second image is displayed in the layout table 1051.

FIG. 3 is a diagram illustrating an example of the layout table. In FIG. 3, the candidate of the layout in a case in which two areas are displayed in the print document is indicated. In a case in which two areas are displayed in the print document, the candidate of the layout in which images of two areas are arranged on the document has eight types, that is, number (1)-number (8). For example, in the layout represented by number (1), a direction of the document is the vertical direction, a direction of arrangement of two images is the vertical direction, and the image of the first area and the image of the second area are arranged in order from top to bottom.

The control panel 102 displays a plurality of the images representing the candidates of the layout acquired from the layout generation section 105.

Figure 4:
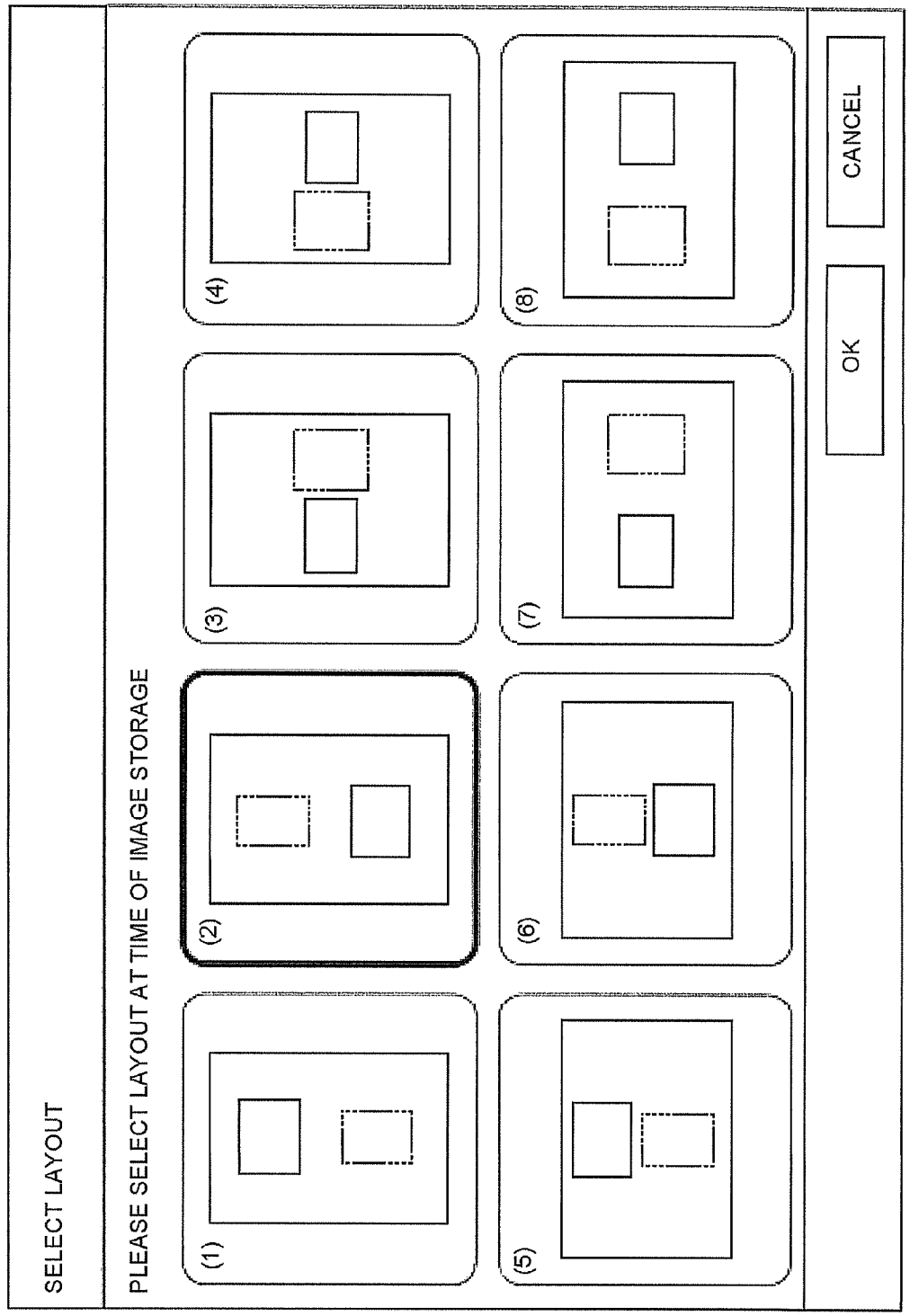
FIG. 4 is a diagram illustrating an example of a layout selection screen displayed on a control panel of the image processing apparatus 100 according to the embodiment.

FIG. 4 is a diagram illustrating an example of display of the image representing the candidate of the layout on the control panel 102. In FIG. 4, the layouts indicated by (1)-(8) respectively correspond to numbers (1)-(8) shown in FIG. 3. The user refers to the candidate of the layout to determine which layout is the place where the image is arranged. In the example shown in FIG. 4, the user presses the layout indicated by number (2) to select (2). If the user presses an "OK" button, the image data of the image of the first area, the image data of the image of the second area and identification information of the layout selected by the user are output to the layout determination section 106.

The layout determination section 106 sets the layout of the arrangement of the first image and the second image on the basis of the information representing the candidate of the layout supplied from the layout generation section 105 and the identification information of the layout supplied from the control panel 102.

The layout determination section 106 acquires the first image by processing the image data of the image of the first area and acquires the second image by processing the image data of the image of the second area. The layout determination section 106 generates an image of the arrangement of the first image and the second image on the document according to the determined layout. The layout determination section 106 outputs image data of the generated image to the storage section 107.

The storage section 107 is a storage device such as a magnetic hard disk device and a semiconductor storage device. The storage section 107 stores the image data supplied by the layout determination section 106.

The image processing apparatus 100 is connected with a terminal device 300 via a LAN 50. The terminal device 300 may acquire the image data stored in the storage section 107 of the image processing apparatus 100 to display the image data.

The print engine 108 acquires the image data stored in the storage section 107 on the basis of a print job to execute a printing processing.

(Operations of Image Processing Apparatus)

Figure 5:
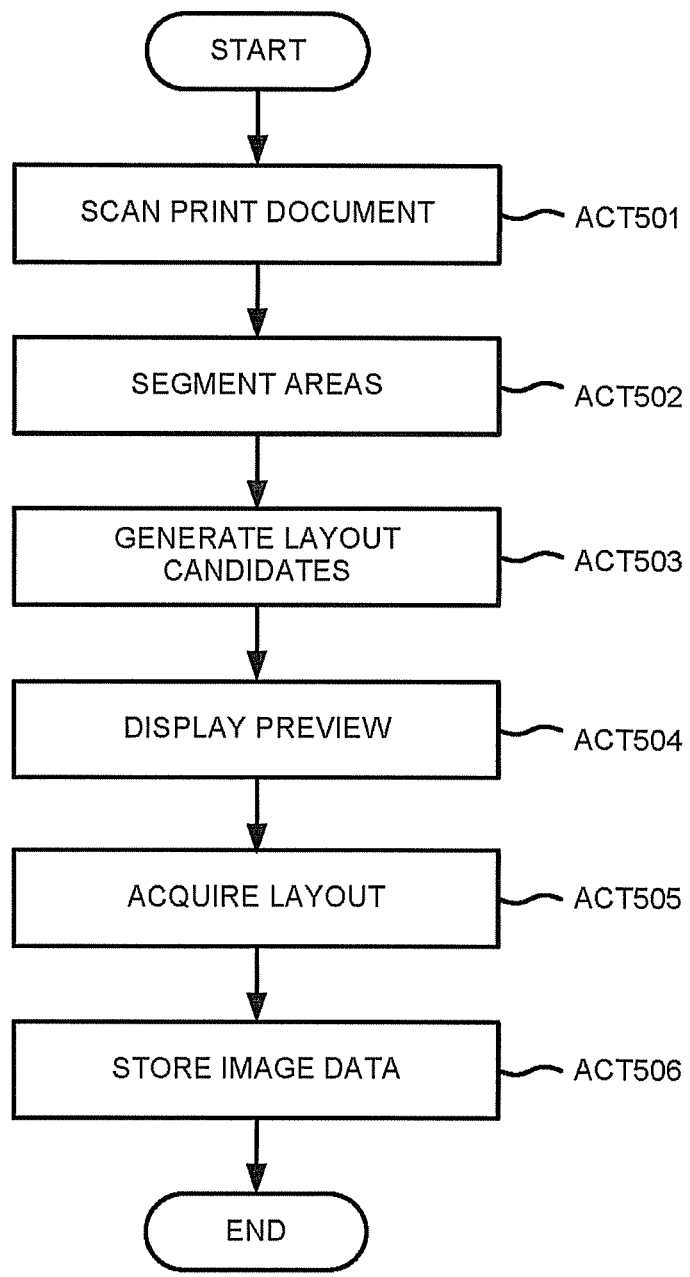
FIG. 5 is a flowchart illustrating an example of a processing of the image processing apparatus 100 according to the embodiment.
Figure 6:
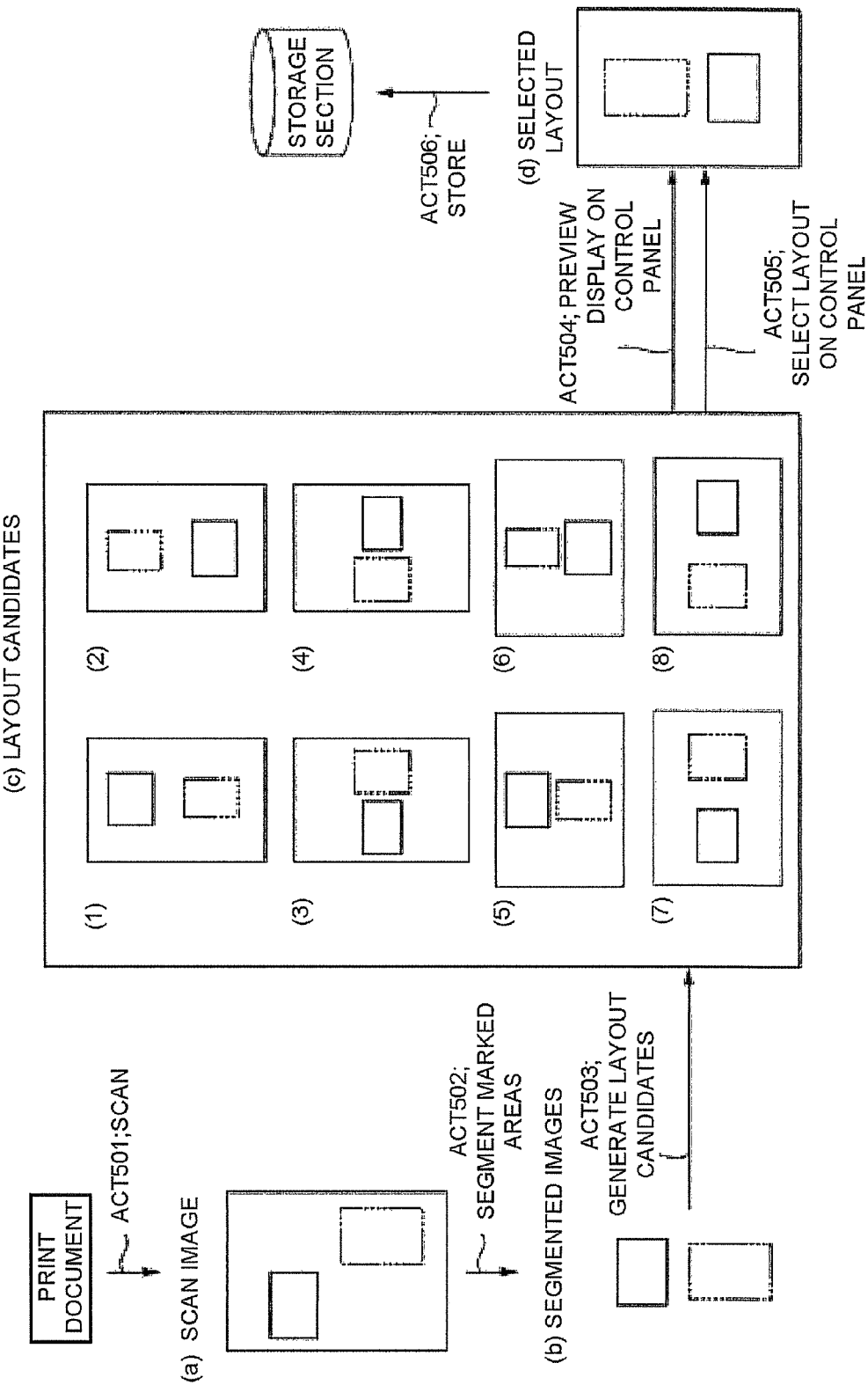
FIG. 6 is a diagram illustrating an example of a processing of the image processing apparatus 100 according to the embodiment.

With reference to FIG. 5 and FIG. 6, a processing of the image processing apparatus 100 according to the embodiment is described. FIG. 5 is a flowchart illustrating an example of the processing of the image processing apparatus 100 according to the embodiment.

The scanner 103 scans the print document to read the print document (ACT 501). The scanner 103 outputs the image data generated by reading the print document to the segmentation section 104. As shown in FIG. 6, image data of a scan image indicated by the first area and the second area is obtained in such a manner that the print document is read by the scanner 103. In FIG. 6, the first area is indicated by the solid line, and the second area is indicated by the broken line.

The segmentation section 104 segments areas encircled by marks from the image obtained by processing the image data acquired from the scanner 103 (ACT 502). As shown in FIG. 6, the segmentation section 104 extracts the image of the first area and the image of the second area from the image obtained by processing the image data supplied from the scanner 103.

The layout generation section 105 acquires an image by processing the image data supplied from the segmentation section 104. The layout generation section 105 generates the image representing the candidate of the layout in a case of arranging the image acquired from the segmentation section 104 on the document (ACT 503). As shown in FIG. 6, the layout generation section 105 refers to the layout table 1051 to generate eight types of candidates of the layout as the candidates of the layout in a case of arranging the first image and the second image on the document. The layout generation section 105 generates the images representing eight types of candidates of the layout.

The layout generation section 105 displays the image representing the candidate of the layout on the control panel 102 (ACT 504).

The layout determination section 106 acquires the identification information of the layout from the control panel 102 and acquires the information representing the candidate of the layout from the layout generation section 105 (ACT 505). As shown in FIG. 6, the layout determination section 106 acquires, for example, the identification information "number (2)" of the layout. The layout determination section 106 generates the layout corresponding to the identification information "number (2)" of the layout on the basis of the information representing the candidate of the layout supplied from the layout generation section 105. As a result, the layout determination section 106 acquires the layout in which the second area and the first area are arranged from top to bottom in the vertical direction on the document.

The layout determination section 106 generates the image of the arrangement of the first image and the second image on the document according to the determined layout. The layout determination section 106 outputs image data of the generated image to the storage section 107 (ACT 506).

In the foregoing embodiment, a case in which two areas are shown in the print document is described; however, the present invention is not limited to this. For example, a case in which three or more areas are shown in the print document is also applicable. In this case, a layout table in which candidates of a layout in a case in which three or more areas are shown in the print document are shown is prepared in advance and stored in the layout generation section 105. The layout generation section 105 generates a plurality of images representing the candidate of the layout in a case of arranging images obtained by processing image data of images of three or more areas on the basis of the layout table.

Further, in the foregoing embodiment, a case in which the shape of the area shown in the print document is rectangle is described; however, the present invention is not limited to this. For example, the shape of the area shown in the print document may be a circular form or a triangle.

Further, in the foregoing embodiment, in a case in which the first image and the second image are vertically arranged in parallel in the long side direction of the document as the candidate of the layout of the arrangement of the first image and the second image on the document, a case in which the center line of the document in the short side direction, the center line of the first image and the center line of the second image are coincident is described; however, the present invention is not limited to this. For example, in a case in which the first image and the second image are vertically arranged in parallel in the long side direction of the document, the center line of the document in the short side direction, the center line of the first image and the center line of the second image may not be coincident.

Further, in the foregoing embodiment, in a case in which the first image and the second image are horizontally arranged in parallel in the short side direction of the document as the candidate of the layout of the arrangement of the first image and the second image on the document, a case in which the center line of the document in the long side direction, the center line of the first image and the center line of the second image are coincident is described; however, the present invention is not limited to this. For example, the center line of the document in the long side direction, the center line of the first image and the center line of the second image may not be coincident.

Further, in the foregoing embodiment, a case in which the first image and the second image included in the print document are arranged on the document at the equal magnification; however, the present invention is not limited to this. For example, either or both of the first image and the second image included in the print document may be reduced to be arranged on the document. Otherwise, for example, either or both of the first image and the second image included in the print document may be expanded to be arranged on the document. Otherwise, for example, each of the first image and the second image included in the print document may be arranged on a plurality of the documents.

Figure 7:
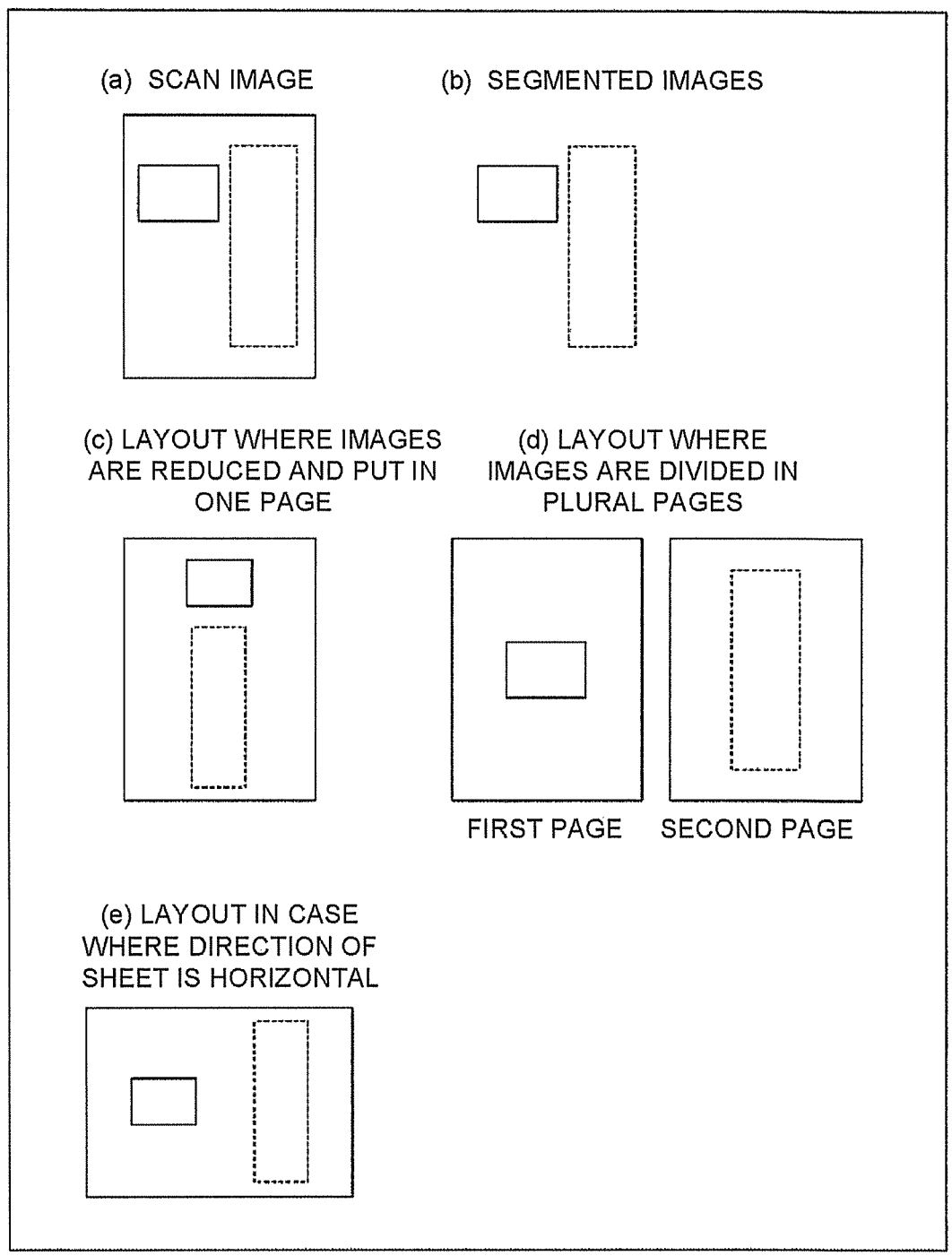
FIG. 7 is a diagram illustrating an example of a layout of segmented images.

FIG. 7 is a diagram illustrating other examples of the layout in a case in which two areas are shown on a print document. The scanner 103 scans the print document to read the print document to generate the image data. In the scan image, the first area indicated by the solid line and the second area indicated by the broken line are included. The segmentation section 104 extracts the image of the first area and the image of the second area from the scan image.

The layout generation section 105 may reduce the image of the first area and the image of the second area to parallelly arrange the reduced images in the long side direction of the document as shown in FIG. 7 (*c*). Further, the layout generation section 105 arranges the image of the first area and the image of the second area at the equal magnification on a plurality of the documents as shown in FIG. 7 (*d*). The layout generation section 105 may reduce the image of the first area and the image of the second area to parallelly arrange the reduced images in the short side direction of the document as shown in FIG. 7 (*e*).

In the foregoing embodiment, a case in which the first area and the second area are designated in different colors is described; however, the present invention is not limited to this. For example, the first area and the second area may be designated in different line types.

In the foregoing embodiment, a case in which the image processing apparatus 100 stores the image data in the storage section 107 is described; however, the present invention is not limited to this. For example, the image processing apparatus 100 may store the image data in an external storage section such as an USB (Universal Serial Bus) memory connected with the image processing apparatus 100 or output the image data to a network. Further, the image processing apparatus 100 may print the image data.

According to the image processing apparatus 100 of the present embodiment, areas the user wants to leave in the image data on the print document are marked in different colors in advance. The image processing apparatus 100 segments the marked areas from the image obtained by reading the print document. The image processing apparatus 100 generates the candidates of the layout of the arrangement of the images of the segmented areas on the document according to a combination of colors used for marking the segmented areas. The image processing apparatus 100 displays the candidate of the layout on the control panel 102. In this way, the user can select the layout of the arrangement of images of the areas the user wants to leave in the image data on the document. The image processing apparatus 100 generates an image of the arrangement of the images of the areas the user wants to leave on the document according to the layout selected by the user and stores the image. Through such a configuration, the image processing apparatus 100 arranges a plurality of the areas contained in the print document on the document according to the layout selected by the user and leaves the areas in the image data.

(Modification)

An image processing apparatus according to the modification does not include the layout generation section 105 in the foregoing embodiment. In this case, the segmentation section 104 supplies the set of the image data of the image of the first area and the first color information and the set of the image data of the image of the second area and the second color information to the layout determination section 106.

The layout determination section 106 determines a layout of arrangement of the first image and the second image on the basis of the set of the image data of the image of the first area and the first color information and the set of the image data of the image of the second area and the second color information supplied from the segmentation section 104. The layout may be determined in advance on the basis of the number of the images supplied from the segmentation section 104.

Operations of the image processing apparatus according to the modification omit the processing in ACT 503-ACT 505 in FIG. 5. In this case, in ACT 506, the layout determination section 106 determines the layout of the arrangement of the first image and the second image on the basis of the set of the image data of the image of the first area and the first color information and the set of the image data of the image of the second area and the second color information supplied from the segmentation section 104. Then, the layout determination section 106 generates an image of the arrangement of the first image and the second image on the document according to the determined layout. The layout determination section 106 outputs image data of the generated image to the storage section 107. Through such a configuration, compared with the foregoing embodiment, as the processing of generating the layout is not carried out, a processing load of the image processing apparatus 100 can be reduced.

Second Embodiment

In the second embodiment, generation of a layout carried out by the image processing apparatus according to the foregoing embodiment is carried out by a terminal device.

Figure 8:
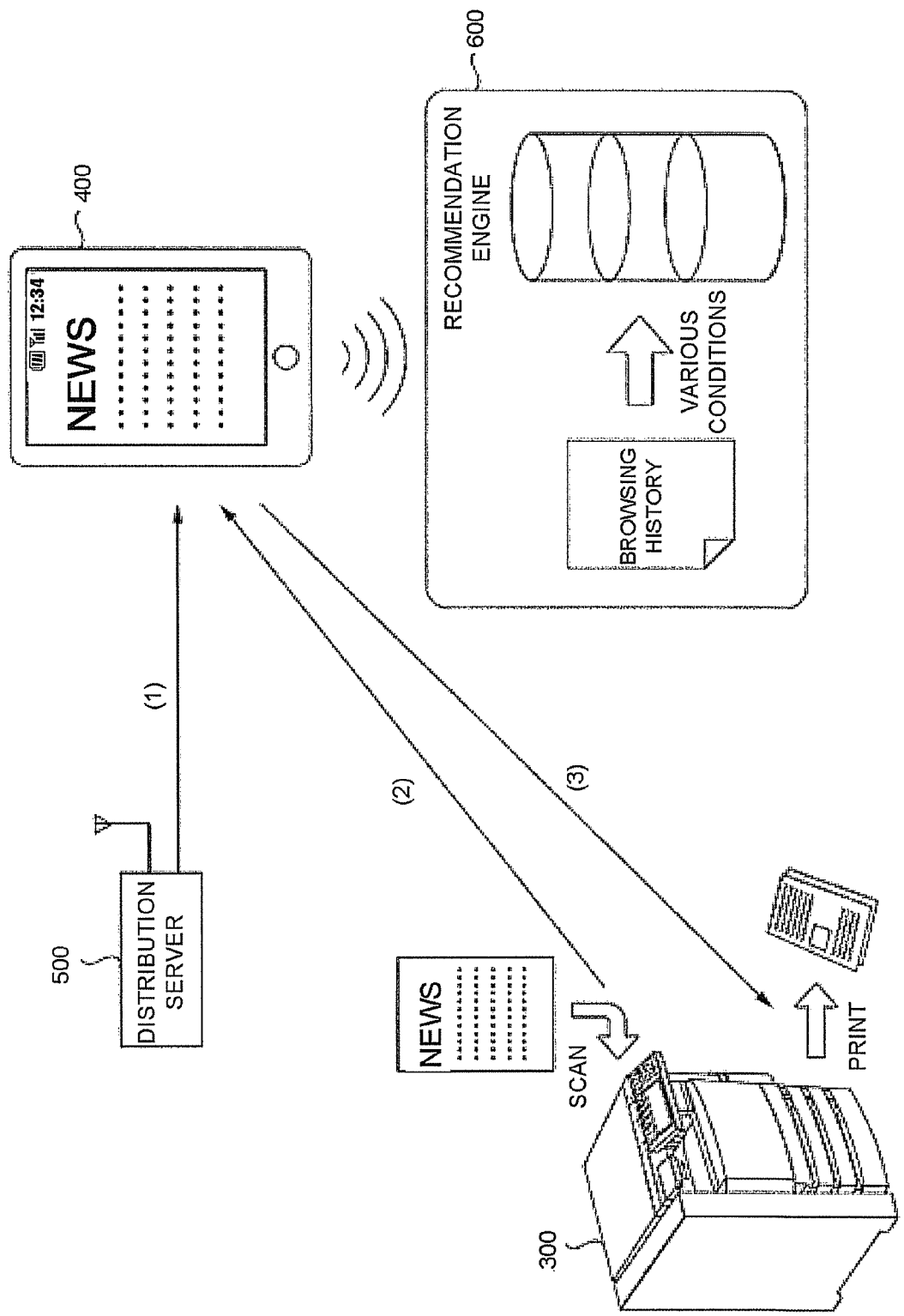
FIG. 8 is an external view illustrating an example of the whole configuration of a system according to the embodiment.

FIG. 8 is a diagram illustrating an example of the configuration of a system in which the terminal device is applied according to the embodiment.

The system is equipped with a distribution server 500 for providing a service to distribute contents of a newspaper of a newspaper company, a terminal device 400 and an image processing apparatus 300.

The distribution server 500 sends contents of an electronic newspaper to the terminal device 400 (1). The terminal device 400 displays the electronic newspaper if receiving the electronic newspaper sent from the distribution server 500. An example of the terminal device 400 is a mobile phone, a smart phone, or a tablet terminal.

The image processing apparatus 300 may send image data obtained by scanning the paper surface of the newspaper to the terminal device 400 (2). The terminal device 400 may store the image data acquired from the image processing apparatus 300 and display an image obtained by processing the image data.

The user refers to the electronic newspaper displayed on the terminal device 400 to designate an article the user wants to scrap. Furthermore, in a case of printing the article the user wants to scrap, the user operates the terminal device 400 to input a printing condition such as a sheet size, the number of sheets and the like and press a print execution button. If the print execution button is pressed, print data and the printing condition are sent from the terminal device 400 to the image processing apparatus 300 (3).

If receiving the print data and the printing condition from the terminal device 400, the image processing apparatus 300 processes the print data according to the printing condition.

Further, the user operates the terminal device 400 to send browsed articles to a recommendation engine 600 built in the cloud. In this case, the recommendation engine 600 estimates articles in which the user is interested within images sent from the distribution server 500 according to browsing information such as browsing history and browsing time sent from the terminal device 400. The recommendation engine 600 automatically checks the articles estimated as articles in which the user is interested. The recommendation engine 600 sends the checked articles to the terminal device 400.

If receiving the articles sent from the recommendation engine 600, the terminal device 400 displays the articles. The user can refer to the articles displayed on the terminal device 400 to select a necessary article.

FIG. 9 is a diagram illustrating an example of the hardware structure of the terminal device 400 according to the embodiment. The terminal device 400 is equipped with a CPU 401, an UI (User Interface) 402, a memory 403, a non-volatile memory 404, a display device 405, a communication I/F 406 and a storage section 407.

The CPU 401 executes a program stored in, for example, the non-volatile memory 404 and uses the memory 403 as a working memory to control each section of the terminal device 400.

The UI 402 which is an input device for receiving an operation of the user includes a pointing device such as a mouse and a touch panel, a device such as a keyboard for inputting character information, a button, a touch sensor and a touch pad.

The memory 403, composed of a RAM such as a volatile memory that uses a semiconductor element, is used as the working memory of the CPU 401.

The non-volatile memory 404 is composed of, for example, HD (Hard Disk) and a ROM. In the non-volatile memory 404, a program 4041 executed by the CPU 401 is stored.

The display device 405 controlled by the CPU 401 displays an image, a GUI (Graphical User Interface) and the like. The CPU 401 executes the program 4041 to generate a control signal and a video signal indicating the image to be displayed on the display device 405 to output the control signal and the video signal to the display device 405. The display device 405 displays a video by processing the video signal output by the CPU 401.

The communication I/F 406 communicates with an external device such as the image processing apparatus 300, the external device and the recommendation engine 600 connected with a communication network such as an Internet to carry out transmission and reception of various data such as the image data and the printing condition.

The storage section 407 is composed of, for example, an HD (Hard Disk) and a ROM. In the storage section 407, image data of a scrapped article is stored.

An inner bus line 410 is mutually connected with the CPU 401, the UI 402, the memory 403, the non-volatile memory 404, the display device 405, the communication I/F 406 and the storage section 407. Each section connected with the inner bus line 410 can mutually carry out exchange of data via the inner bus line 410.

FIG. 10 is a functional block diagram illustrating functional components of the terminal device 400 according to the embodiment.

The terminal device 400 according to the embodiment functions as a device equipped with the UI 402, an image acquiring section 403, a segmentation section 404, a layout generation section 405, a layout determination section 406, a storage section 407 and an information code generation section 408 in such a manner that the CPU 401 executes the program 4041 stored in the non-volatile memory 404.

All or part of functions of the image processing apparatus 100 may be realized by using hardware such as the ASIC, the PLD, the FPGA and the like. A program may be recorded in a computer-readable recording medium. The computer-readable recording medium is a portable medium such as a flexible disk, a magneto-optical disk, a ROM and a CD-ROM, or a storage device such as a hard disk built in a computer system. The terminal device 400 may acquire a control program via an electric communication line.

The UI 402 receives input from the user. Operations of the image acquiring section 403 are realized through a command from the CPU 401 and the communication I/F 406. The image acquiring section 403 acquires the image data sent from the distribution server 500. The image acquiring section 403 outputs the image data to the segmentation section 404. Further, the image acquiring section 403 outputs the image data to the display device 405.

The display device 405 displays an image by processing the image data if acquiring the image data from the image acquiring section 403. An example of the image displayed on the display device 405 is one or more articles and a check box arranged in association with each of one or more articles. The user refers to one or more articles displayed on the display device 405 to input a check in a check box corresponding to an article the user himself/herself wants to scrap. In the present embodiment, the description of a case in which the user inputs checks in the check boxes corresponding to two articles among a plurality of the articles displayed on the display device 405 is continued.

If the user inputs the checks in the check boxes corresponding to the two articles, information indicating images corresponding to the articles corresponding to the check boxes is output from the UI 402 to the segmentation section 404.

If the information indicating the images is supplied from the UI 402, the segmentation section 404 segments images corresponding to the information indicating the images from the images supplied from the image acquiring section 403. The segmentation section 404 extracts a first image and a second image as the images corresponding to the information indicating the images from the images supplied from the image acquiring section 403. The segmentation section 404 supplies image data of the first image and image data of the second image to the layout generation section 405.

The layout generation section 405 acquires a first image by processing the image data of the first image supplied from the segmentation section 404. Furthermore, the layout generation section 405 acquires a second image by processing the image data of the second image supplied from the segmentation section 404.

The layout generation section 405 generates a plurality of images representing candidates of a layout in a case of arranging the first image and the second image on the document. For example, the layout generation section 405 generates images representing candidates of a layout in which a thumbnail of the first image and a thumbnail of the second image are arranged on the document. The layout generation section 405 outputs a plurality of the images representing the candidates of the layout to the display device 405. Further, the layout generation section 405 outputs information representing the candidate of the layout to the layout determination section 406. For example, the layout generation section 405 stores a layout table. A plurality of the candidates of the layout of arrangement of the first image and the second image on the document is displayed in the layout table. FIG. 3 is applicable to an example of the layout table.

The display device 405 displays a plurality of the images representing the candidates of the layout acquired from the layout generation section 405. FIG. 4 is applicable to an example of display of a plurality of the images representing the candidates of the layout on the display device 405.

The layout determination section 406 determines a layout of arrangement of the first image and the second image on the basis of the information representing the candidate of the layout supplied from the layout generation section 405 and the identification information of the layout supplied from the UI 402.

The layout determination section 406 acquires the first image by processing the image data of the first image and acquires the second image by processing the image data of the second image. The layout determination section 406 generates an image of the arrangement of the first image and the second image on the document according to the determined layout. The layout determination section 406 outputs image data of the generated image to the storage section 407.

Further, the layout determination section 406 may output the first image to the information code generation section 408. Then, the layout determination section 406 may acquire an information code such as a QR (Quick Response) code in which a link destination of the first image from the information code generation section 408 is embedded. Similarly, the layout determination section 406 outputs the second image to the information code generation section 408 and then acquires an QR code in which a link destination of the second image from the information code generation section 408 is embedded. In this case, the layout determination section 406 may generate an image of arrangement of the first image, the QR code of the first image, the second image and the QR code of the second image on the document according to the determined layout.

Figure 11:
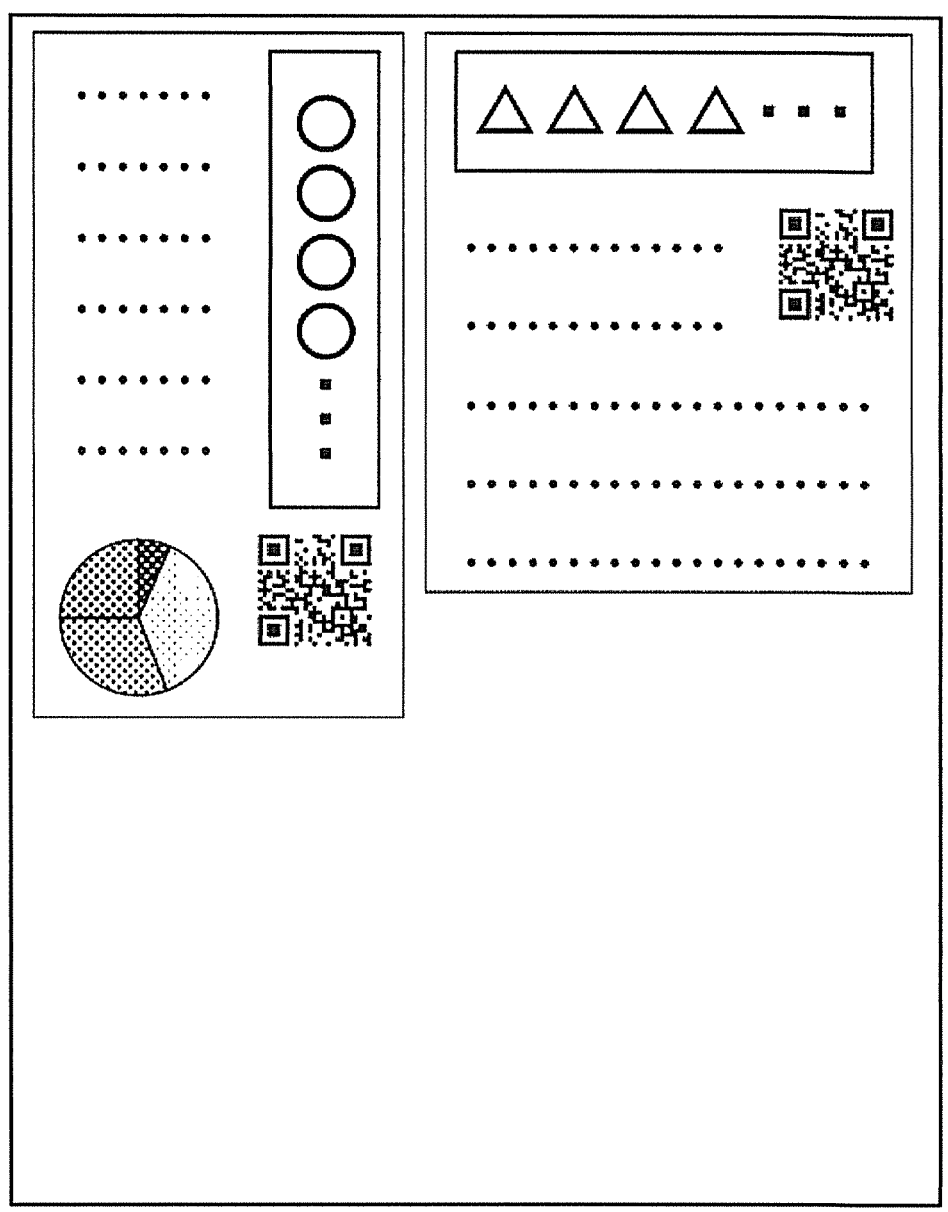
FIG. 11 is a diagram illustrating an example of a document on which an image is printed.

FIG. 11 is a diagram illustrating an example of the image of the arrangement of the first image, the QR code of the first image, the second image and the QR code of the second image on the document.

The storage section 407 is composed of a storage device such as a magnetic hard disk device and a semiconductor storage device. The storage section 407 stores the image data generated by the layout determination section 406.

(Operations of Terminal Device)

Figure 12:
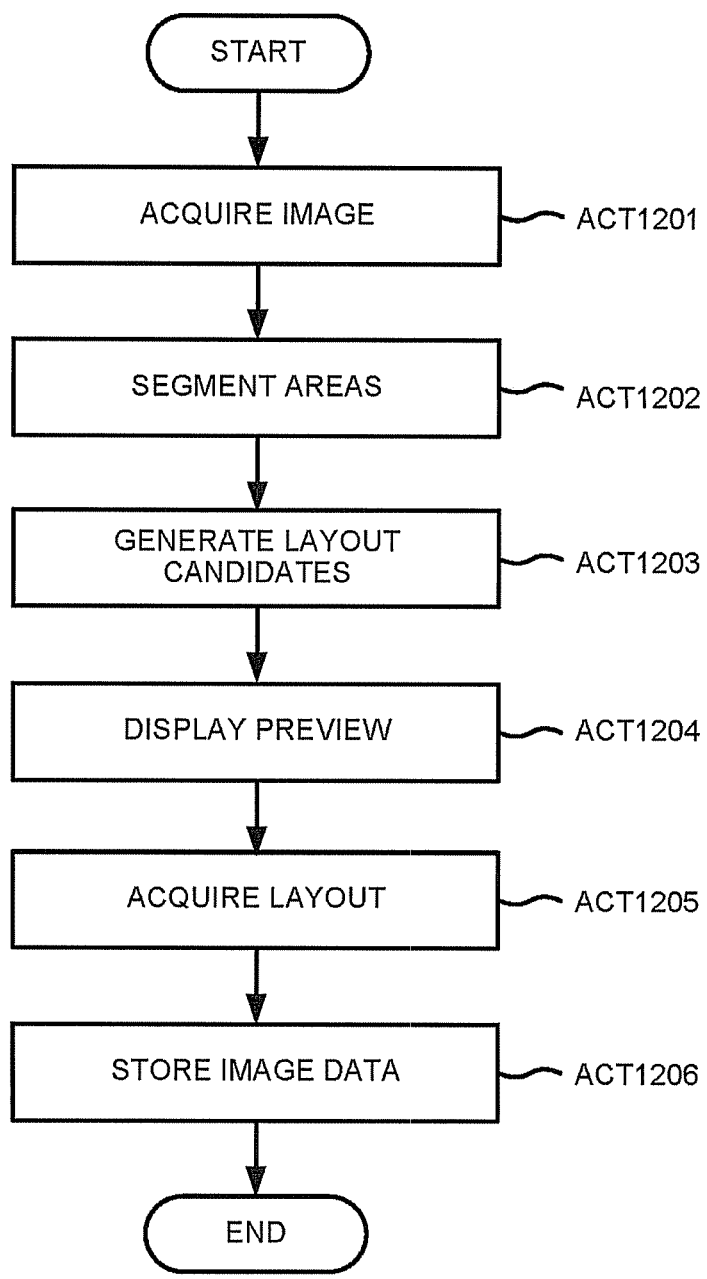
FIG. 12 is a flowchart illustrating an example of a processing of the terminal device 400 according to the embodiment.

A processing of the terminal device 400 according to the embodiment is described with reference to FIG. 12. FIG. 12 is a flowchart illustrating an example of the processing of the terminal device 400 according to the embodiment.

The image acquiring section 403 acquires the image data (ACT 1201). The image acquiring section 403 acquires the image data distributed from the distribution server 500 and outputs the acquired image data to the segmentation section 404.

The segmentation section 404 segments areas designated by the user from the image obtained by processing the image data acquired from the image acquiring section 403 (ACT 1202).

The layout generation section 405 acquires an image by processing the image data supplied from the segmentation section 404. The layout generation section 405 generates the image representing the candidate of the layout in a case of arranging the images acquired from the segmentation section 404 on the document (ACT 1203).

The layout generation section 405 displays the image representing the candidate of the layout on the display device 405 (ACT 1204).

The layout determination section 406 acquires the identification information of the layout from the UI 402 and the information representing the candidate of the layout from the layout generation section 405 (ACT 1205).

The layout determination section 406 generates the image of the arrangement of the first image and the second image on the document according to the determined layout. The layout determination section 406 outputs the image data of the generated image to the storage section 407 (ACT 1206).

In the second embodiment, a case in which the user refers to the electronic newspaper displayed on the display device 405 to input the check in the check box corresponding to the article the user himself/herself wants to scrap is described; however, the present invention is not limited to this. For example, the user may refer to the electronic newspaper displayed on the display device 405 to mark the article the user himself/herself wants to scrap. In this case, a plurality of the areas on the electronic newspaper is indicated in different colors. The terminal device 400 may carry out the processing described in the first embodiment to arrange the images of the marked areas on the document according to the layout selected by the user. Further, the terminal device 400 may carry out the processing described in the modification to arrange the images of the marked areas on the document.

The terminal device 400 may acquire the article from the recommendation engine 600. The recommendation engine 600 analogizes fondness of the user and a purpose of browsing the article to recommend contents on the basis of information indicating the article browsed by the user and display time of the article.

Further, the terminal device 400 may acquire a keyword analogized by the recommendation engine 600 to use a curation service on the basis of the keyword. The terminal device 400 may embed a link destination of information obtained by using the curation service in the information code. The terminal device 400 may edit an image including the information code according to the layout selected by the user to store the edited image.

According to the terminal device 400 of the present embodiment, desired information can be extracted from contents of an electronic newspaper, a magazine and the like. Furthermore, the terminal device 400 can edit the desired information extracted to store the edited information according to the layout selected by the user.

According to the terminal device 400 of the present embodiment, by handling an image with image data, the image which can be easily viewed by the user can be printed. Furthermore, in accordance with space of printing sheet surface, as an expansion processing or a reduction processing can be carried out, a layout can be freely executed.

Each device described above includes a computer therein. A process of each processing of each device described above is stored in a computer-readable recording medium in the form of a program, and the processing is carried out by reading out the program to execute the program. The computer-readable recording medium refers to a magnetic disk, a magneto-optical disk, a CD-ROM, a DVD-ROM and a semiconductor memory. The computer program is distributed to the computer via a communication line, and the computer receiving the distribution may execute the program. Further, the foregoing program may be used for realizing part of the function described above.

Furthermore, the program that can realize the function described above through a combination with a program already recorded in a computer system may be a so-called difference file (difference program).

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

In the foregoing embodiments, the segmentation section 104 and the segmentation section 404 are examples of a partial image acquiring section, the layout generation section 105 and the layout generation section 405 are examples of a layout generation section and a storage section, and the layout determination section 106 and the layout determination section 406 are examples of a layout determination section. Further, the control panel 102 and the display device 405 are examples of a display section. The first area and the second area are examples of partial image identification information, and the image of the first area and the image of the second area are examples of a partial image.

What is claimed is:

1. An image processing apparatus, comprising:
an image data acquiring section configured to acquire image data of an image which comprises a plurality of areas indicated by a plurality of different colors, each of the plurality of areas having a respective partial image of the image, the image data acquiring section configured to label a first area to an area, which is included in the plurality of areas and which is indicated by a first color of the plurality of different colors, the image data acquiring section configured to label a second area to another area, which is included in the plurality of areas which is indicated by a second color of the plurality of different colors;
a partial image acquiring section configured to acquire information of a respective color for each of the plurality of areas from the image data acquiring section, and the partial image acquiring section configured to acquire, based on the information of a respective color, respective partial image data of the respective partial image of each of the plurality of areas, from the image data acquired by the image data acquiring section; and
a layout generation section configured to output a plurality of candidates of layout of the plurality of the partial images acquired by the partial image acquiring section.

2. The image processing apparatus according to claim 1, wherein
the image data acquiring section acquires the image data by reading the image.

3. The image processing apparatus according to claim 1, wherein
the image data acquiring section receives image data of an image sent from a distribution server via a network to acquire the image data.

4. The image processing apparatus according to claim 3, wherein
the partial image acquiring section acquires partial image data of a part recommended by a recommendation engine from the image sent from the distribution server.

5. The image processing apparatus according to claim 1, wherein
the first area is indicated in the print document and which indicates an image extracted by the partial image acquiring section; and
the second area is indicated in the print document and which indicates an image extracted by the partial image acquiring section.

6. The image processing apparatus according to claim 1, further comprising
a storage section configured to store a table comprising candidates of the layout of the plurality of the partial images according to a number of the partial images acquired by the partial image acquiring section, wherein
the layout generation section output the layout of the plurality of the partial images on a basis of the table corresponding to the number of the partial images acquired by the partial image acquiring section.

7. The image processing apparatus according to claim 1, further comprising
a display section configured to display a preview of a plurality of the candidates of the layout generated by the layout generation section.

8. The image processing apparatus according to claim 1, wherein
the layout generation section expands or reduces the plurality of the partial images acquired by the partial image acquiring section to arrange the expanded or reduced images.

9. A control method, comprising:
acquiring image data of an image which comprises a plurality of areas indicated by a plurality of different colors, each of the plurality of areas having a respective partial image of the image;
labeling a first area to an area, which is included in the plurality of areas and which is indicated by a first color of the plurality of different colors;
labeling a second area to another area, which is included in the plurality of areas and which is indicated by a second color of the plurality of different colors;
acquiring information of a respective color for each of the plurality of areas from an image data acquiring section;
acquiring, based on the information of a respective color, respective partial image data of the respective partial image of each of the plurality of areas, from the image data acquired by the image data acquiring section; and
outputting a plurality of candidates of layout of the plurality of partial images acquired by the partial image acquiring section.

10. The method according to claim 9, wherein
acquiring image data comprises reading the image.

11. The method according to claim 9, wherein
acquiring image data comprises receiving image data of an image sent from a distribution server via a network.

12. The method according to claim 11, wherein
acquiring the plurality of partial images comprises using a recommendation sent from the distribution server.

13. The method according to claim 9, wherein
the first area is indicated in the print document and which indicates an image extracted by the partial image acquiring section; and
the second area is indicated in the print document and which indicates an image extracted by the partial image acquiring section.

14. The method according to claim 9, further comprising
a storage section configured to storing a table comprising candidates of the layout of the plurality of the partial images according to a number of the partial images acquired, and
outputting the layout of the plurality of the partial images on a basis of the table corresponding to a number of the partial images acquired.

15. The method according to claim 9, further comprising
displaying a preview of the plurality of the candidates of the layout generated.

16. The method according to claim 9, wherein generating comprises expanding or reducing the plurality of the partial images acquired to arrange the expanded or reduced images.

* * * * *